(12) United States Patent
Nobumoto et al.

(10) Patent No.: US 12,013,501 B2
(45) Date of Patent: Jun. 18, 2024

(54) SCINTILLATOR STRUCTURE AND MANUFACTURING METHOD THEREOF

(71) Applicant: Hitachi Metals, Ltd., Tokyo (JP)

(72) Inventors: Yousuke Nobumoto, Tokyo (JP); Shinsuke Terazawa, Tokyo (JP); Satoshi Shiota, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 18/180,184

(22) Filed: Mar. 8, 2023

(65) Prior Publication Data

US 2023/0228889 A1 Jul. 20, 2023

Related U.S. Application Data

(63) Continuation of application No. 17/371,328, filed on Jul. 9, 2021, now Pat. No. 11,619,750.

(30) Foreign Application Priority Data

Sep. 30, 2020 (JP) .................................. 2020-164700
Sep. 30, 2020 (JP) .................................. 2020-164701

(Continued)

(51) Int. Cl.
*G01T 1/20* (2006.01)
*C09K 11/02* (2006.01)
*C09K 11/62* (2006.01)

(52) U.S. Cl.
CPC .......... *G01T 1/2002* (2013.01); *C09K 11/025* (2013.01); *C09K 11/621* (2013.01); *G01T 1/2012* (2013.01); *G01T 1/2018* (2013.01)

(58) Field of Classification Search
CPC ... G01T 1/2002; G01T 1/2012; G01T 1/2018; G01T 1/202; C09K 11/025; C09K 11/621
See application file for complete search history.

(56) References Cited

U.S. PATENT DOCUMENTS 5,956,382 A * 9/1999 Wiener-Avnear ...... B23K 26/00
250/367
8,153,983 B1 * 4/2012 Shah ........................ G01T 1/202
250/361 R (Continued)

FOREIGN PATENT DOCUMENTS

JP 2006-153874 A 6/2006
JP 2017-191113 A 10/2017

(Continued)

OTHER PUBLICATIONS

Notification of Reasons for Rejection corresponding to Japanese Patent Application No. 2022-166201, dated May 9, 2023 and its English translation.

(Continued)

*Primary Examiner* — Kiho Kim
(74) *Attorney, Agent, or Firm* — McCormick, Paulding & Huber PLLC

(57) ABSTRACT

A scintillator structure includes a plurality of cells and a reflector covering the plurality of cells. Here, each of the plurality of cells includes a resin and a phosphor, and the phosphor contains gadolinium oxysulfide. A breaking strength of an interface between each of the plurality of cells and the reflector is 900 gf or more.

12 Claims, 14 Drawing Sheets

(30) Foreign Application Priority Data

Sep. 30, 2020 (JP) ................................ 2020-164703
Nov. 26, 2020 (JP) ................................ 2020-195635
Nov. 26, 2020 (JP) ................................ 2020-195636
Nov. 26, 2020 (JP) ................................ 2020-195637

(56) References Cited

U.S. PATENT DOCUMENTS 11,619,750 B2   4/2023   Nobumoto et al.
2006/0226370 A1   10/2006   Gia et al.

FOREIGN PATENT DOCUMENTS

JP   7164064 B2   10/2022
JP   7164065 B2   11/2022

OTHER PUBLICATIONS

Notification of Reasons for Rejection corresponding to Japanese Patent Application No. 2022-166202, dated May 9, 2023 and its English translation.

* cited by examiner

FIG. 11
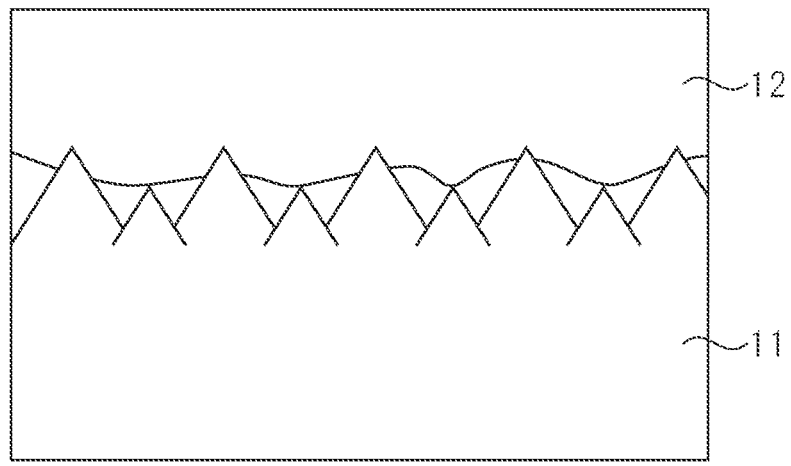
<WITHOUT TITANIUM-OXIDE-LIQUID IMMERSION>
WETTABILITY IMPROVEMENT
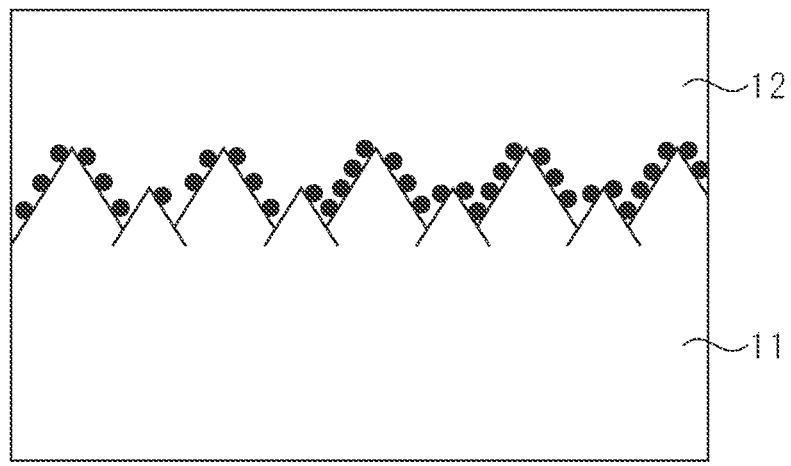
<WITH TITANIUM-OXIDE-LIQUID IMMERSION>

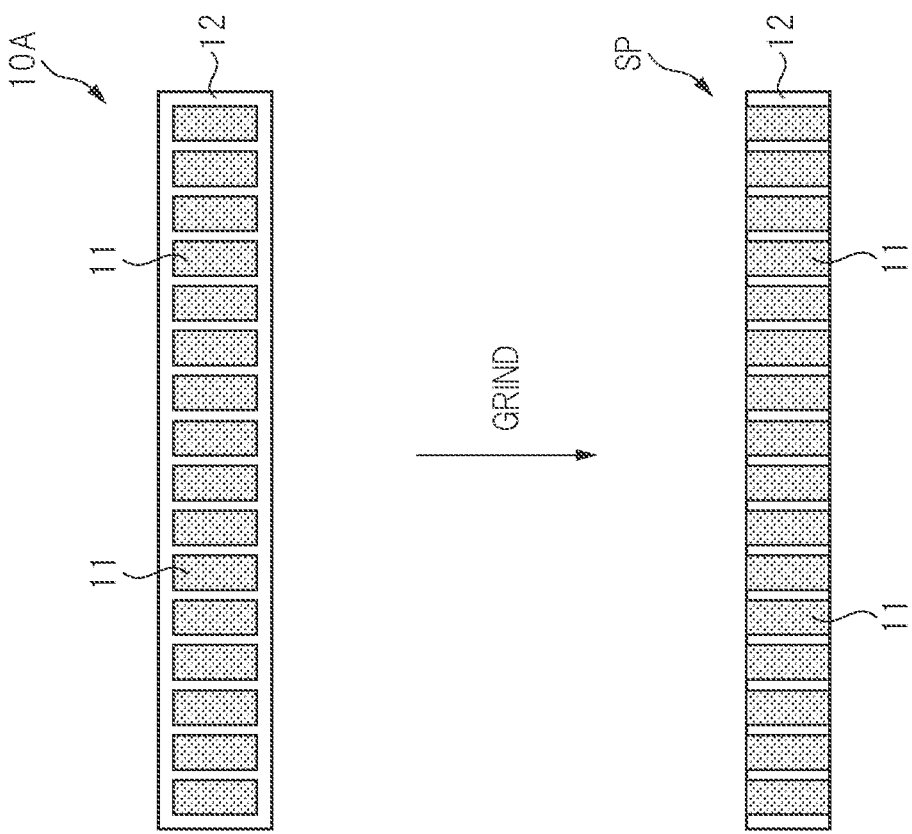

| SURFACE TREATMENT | CONDITION 1 | CONDITION 2 | CONDITION 3 | CONDITION 4 | CONDITION 5 | CONDITION 6 | CONDITION 7 | CONDITION 8 |
|---|---|---|---|---|---|---|---|---|
| LONG-TERM NEGLECT | | | | | | | ○ | ○ |
| IPA TREATMENT | ○ | | ○ | | | | | |
| TITANIUM-OXIDE-LIQUID IMMERSION | ○ | | ○ | ○ | | | ○ | |
| PURE WATER CLEANING AIR-BLOW | ○ | | ○ | ○ | ○ | | ○ | |
| REFLECTOR APPLICATION | ○ | ○ | ○ | ○ | ○ | ○ | ○ | ○ |

SCINTILLATOR STRUCTURE AND MANUFACTURING METHOD THEREOF

CROSS-REFERENCE TO RELATED APPLICATION

This application is a continuation of U.S. patent application Ser. No. 17/371,328, filed Jul. 9, 2021, which claims priority benefits under U.S.C. § 119 to: (1) Japanese Patent Application No. 2020-164700 filed on Sep. 30, 2020; (2) Japanese Patent Application No. 2020-195635 filed on Nov. 26, 2020; (3) Japanese Patent Application No. 2020-164701 filed on Sep. 30, 2020; (4) Japanese Patent Application No. 2020-195636 filed on Nov. 26, 2020; (5) Japanese Patent Application No. 2020-164703 filed on Sep. 30, 2020; and (6) Japanese Patent Application No. 2020-195637 filed on Nov. 26, 2020, the contents of each of which are hereby incorporated by reference in its entirety.

TECHNICAL FIELD

The present invention relates to a scintillator structure and a manufacturing method thereof, for example, a technique effectively applicable to a scintillator structure having a plurality of cells each including a resin and a phosphor and to a manufacturing method thereof.

BACKGROUND

Patent Document 1 (Japanese Patent Application Laid-open No. S63-100391) discloses a technique related to a phosphor molded body that has combined a powder phosphor and an epoxy resin.

Patent Document 2 (Japanese Patent Application Laid-open No. H2-17489) discloses a technique related to a phosphor used in a radiation detector.

SUMMARY

A scintillator is a substance absorbing radiation energy and generating visible light when being applied to radiation representing X-rays and gamma rays. This scintillator is produced as a scintillator structure including the scintillator and a reflector, and an X-ray detector that has combined the scintillator structure and a photoelectric conversion element such as a photodiode is used in, for example, a medical device such as an X-ray computed tomography (CT), an analyzer, a nondestructive inspection device using radiation, a radiation leakage inspection device, or the like.

For example, ceramics made of gadolinium oxysulfide ($Gd_2O_2S$) are used for the scintillator. Here, in the present specification, gadolinium oxysulfide will be referred to as "GOS". Incidentally, strictly speaking, gadolinium oxysulfide itself hardly emits light, but emits light when gadolinium oxysulfide is caused to contain praseodymium, terbium, or the like. For this reason, the term "GOS" in the present specification implicitly intends to use a substance (phosphor) that emits light by containing praseodymium and terbium, etc. in the gadolinium oxysulfide itself. However, when it is necessary to explicitly indicate that the gadolinium oxysulfide itself contains praseodymium and terbium, etc., it may often be expressed as "GOS" containing praseodymium or "GOS" containing terbium.

Further, when the scintillator is composed of "GOS" alone, the "GOS" is made of ceramic. Meanwhile, as described later, it has been considered that the scintillator is composed of a mixture of "GOS" and a resin, and the "GOS" in this case is configured by powder. Therefore, in the present specification, unless ceramic and powder need to be specified in particular, they are simply expressed as "GOS". In contrast, when the ceramic needs to be specified, it will be called "GOS" ceramic. Meanwhile, when the powder needs be specified, it will be called "GOS" powder.

This "GOS" has the advantage of a light-emission output of visible light being larger than that of cadmium tungstate ($CdWO_4$), while its manufacturing cost is high.

Thus, in order to reduce the manufacturing cost of the scintillator structure, using a mixture of "GOS" powder and a resin as the scintillator has been considered.

However, the inventors of the present application have newly found that there is room for improvement in terms of adhesion properties between the scintillator and a reflector (reflection material) when the mixture of the "GOS" powder and resin is used. Therefore, when the mixture of the "GOS" powder and resin is used as the scintillator, it is desired to ensure the adhesion properties between the scintillator and the reflector.

A scintillator structure of one embodiment includes a plurality of cells and a reflector covering the plurality of cells. Here, each of the plurality of cells contains a resin and a phosphor, and the phosphor contains gadolinium oxysulfide. Then, a breaking strength of an interface between each of the plurality of cells and the reflector is 900 gf or more.

According to one embodiment, the adhesion properties between the scintillator and the reflector can be ensured.

BRIEF DESCRIPTIONS OF THE DRAWINGS

FIG. 11 is a diagram for explaining improvement of wettability by a titanium-oxide-liquid immersion treatment;

FIG. 12A is a cross-sectional view schematically showing a manufacturing process of a sample evaluated in a bending test;

FIG. 12B is a top view schematically shows the manufacturing process of the sample evaluated in the bending test;

DETAILED DESCRIPTION

Figure 1:
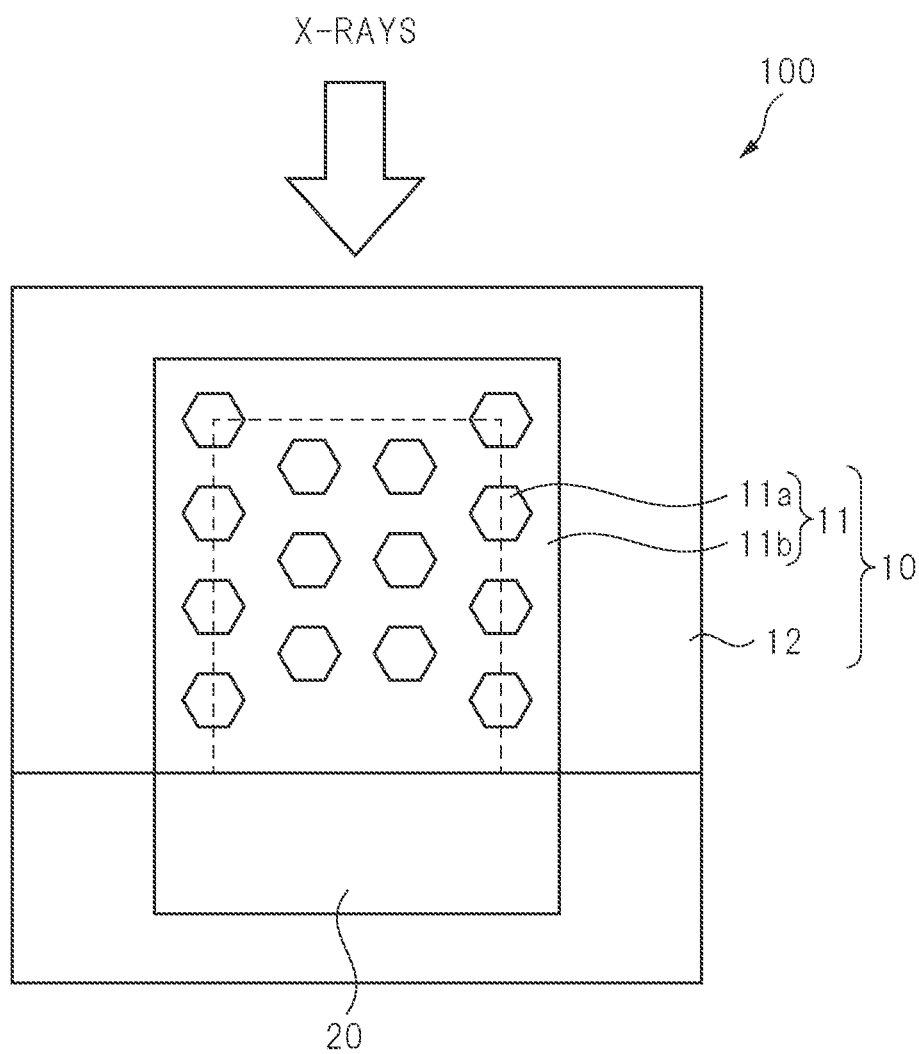
FIG. 1 is a diagram schematically showing an X-ray detector.

In all the drawings for explaining embodiments, the same members are, in principle, given the same reference numerals, and a repetitive description thereof will be omitted. Incidentally, in order to make the drawings easily understand, hatchings may be added even in a plan view.

Overview of X-Ray Detector

FIG. 1 is a diagram schematically showing an x-ray detector.

In FIG. 1, an X-ray detector 100 has a scintillator structure 10 and a light receiving element 20. The scintillator structure 10 is configured by: a scintillator 11 that generates visible light from X-rays incident on the X-ray detector 100; and a reflector 12 that covers the scintillator 11. Meanwhile, the light receiving element 20 has a function of generating a current from the visible light generated at the scintillator 11 and is configured by, for example, a photoelectric conversion element representative of a photodiode.

The scintillator 11 has a function of absorbing X-rays and generating visible light, and is configured by a phosphor 11a and a resin 11b. Here, in the present specification, a material obtained by mixing "GOS" powder composing the phosphor 11a and the resin 11b may be referred to as "resin GOS". That is, the scintillator 11 in the present embodiment is made of "resin GOS". The phosphor 11a is a gadolinium oxysulfide containing praseodymium and terbium, etc., and the resin 11b is, for example, an epoxy resin. Further, the reflector 12 is made of an epoxy resin containing titanium oxide.

The X-ray detector configured in this way operates as shown below.

That is, when X-rays enter the scintillator 11 of the scintillator structure 10, electrons in the phosphor 11a constituting the scintillator 11 receive energy of the X-rays and transition from a ground state to an excited state. Thereafter, the excited electrons transition to the ground state. At this time, visible light corresponding to an energy difference between the excited state and the ground state is emitted. By such a mechanism, the scintillator 11 absorbs X-rays to generate visible light.

Then, some of the visible light beams generated from the scintillator 11 are directly incident on the light receiving element 20, and a part of the others of the visible light beams generated from the scintillator 11 is condensed (collected) at the light receiving element 20 while repeating reflection by the reflector 12 covering the scintillator 11.

Subsequently, for example, when visible light is incident on the light receiving element 20 configured by a photodiode, energy of the visible light excites electrons of a semiconductor material constituting the photodiode from a valence band to a conduction band. Thus, a current caused by the electrons excited in the conduction band flows through the photodiode. Then, an X-ray image(s) is acquired based on the current outputted from the photodiode. In this way, according to the x-ray detector 100, the X-ray image can be acquired.

Reason for Adoption of "Resin GOS"

As described above, in the present embodiment, the "resin GOS" is adopted as the scintillator 11. The reason for this will be described below.

For example, cadmium tungstate (hereinafter referred to as "CWO") is used as the scintillator 11 constituting the scintillator structure 10, and this "CWO" includes cadmium that is a RoHS Directive/REACH Regulation object substance. For this reason, as the scintillator 11, "GOS" ceramic has been used instead of "CWO" containing cadmium. This "GOS" ceramic has the advantage of having a higher visible-light emission output than that of the "CWO", while having the disadvantage of increasing a manufacturing cost.

Therefore, from the viewpoint of reducing the manufacturing cost, as the scintillator 11, adoption (use) of "resin GOS" mixing a resin, which is made of an epoxy resin etc. instead of "GOS" ceramic, and "GOS" powder has been considered. That is, there is a movement to use, as the scintillator 11, "resin GOS" cheaper than the "GOS" ceramic in order to suppress an increase in the manufacturing cost due to the "GOS" ceramic.

However, the "resin GOS" has a lower light-emission output than that of the "GOS" ceramic, and it is desired to ensure the light-emission output even when the "resin GOS" is adopted as the scintillator 11.

Factor of Reduction in Light-Emission Output

First, in the "resin GOS", a cause(s) of a decrease in light-emission output will be described.

First Cause

"Resin GOS" is composed of, for example, a mixture of a resin such as an epoxy resin and "GOS" powder. Then, both the epoxy resin and the "GOS" powder have translucency with respect to visible light. In this respect, the translucency of the epoxy resin is higher than that of "GOS". From this, the translucency of the "resin GOS" is higher than that of the "GOS" ceramic. Therefore, as a result of the translucency of the "resin GOS" being higher than that of the "GOS", at first glance, the light-emission output of the scintillator 11 using the "resin GOS" is considered to be higher than the light-emission output of the scintillator 11 using the "GOS" ceramic.

However, in reality, the light-emission output of the scintillator 11 using the "resin GOS" becomes lower than the light-emission output of the scintillator 11 using the "GOS" ceramic.

This reason is thought as follows: the "resin GOS" uses the "GOS" powder and, as a result, a total surface area of the "GOS" powder constituting the "resin GOS" becomes larger than a total surface area of the "GOS" ceramic. That is, in the "resin GOS", a large amount of "GOS" powder is present in the epoxy resin, so that even if light emitted by the "GOS" powder is radiated into the epoxy resin from the "GOS" powder, it is then multiply scattered on the surface of the large amount of present "GOS" powder and each time it is scattered, light absorption occurs on the surface of the "GOS" powder. As a result, the light absorption of "resin GOS" is larger than that of the "GOS" ceramic, so that the light-emission output of the scintillator 11 using the "resin GOS" is considered to be lower than the light-emission output of the scintillator 11 using the "GOS" ceramic. This is presumed to be the first cause of the decrease in light-emission output in the "resin GOS".

Second Cause

Figure 2:
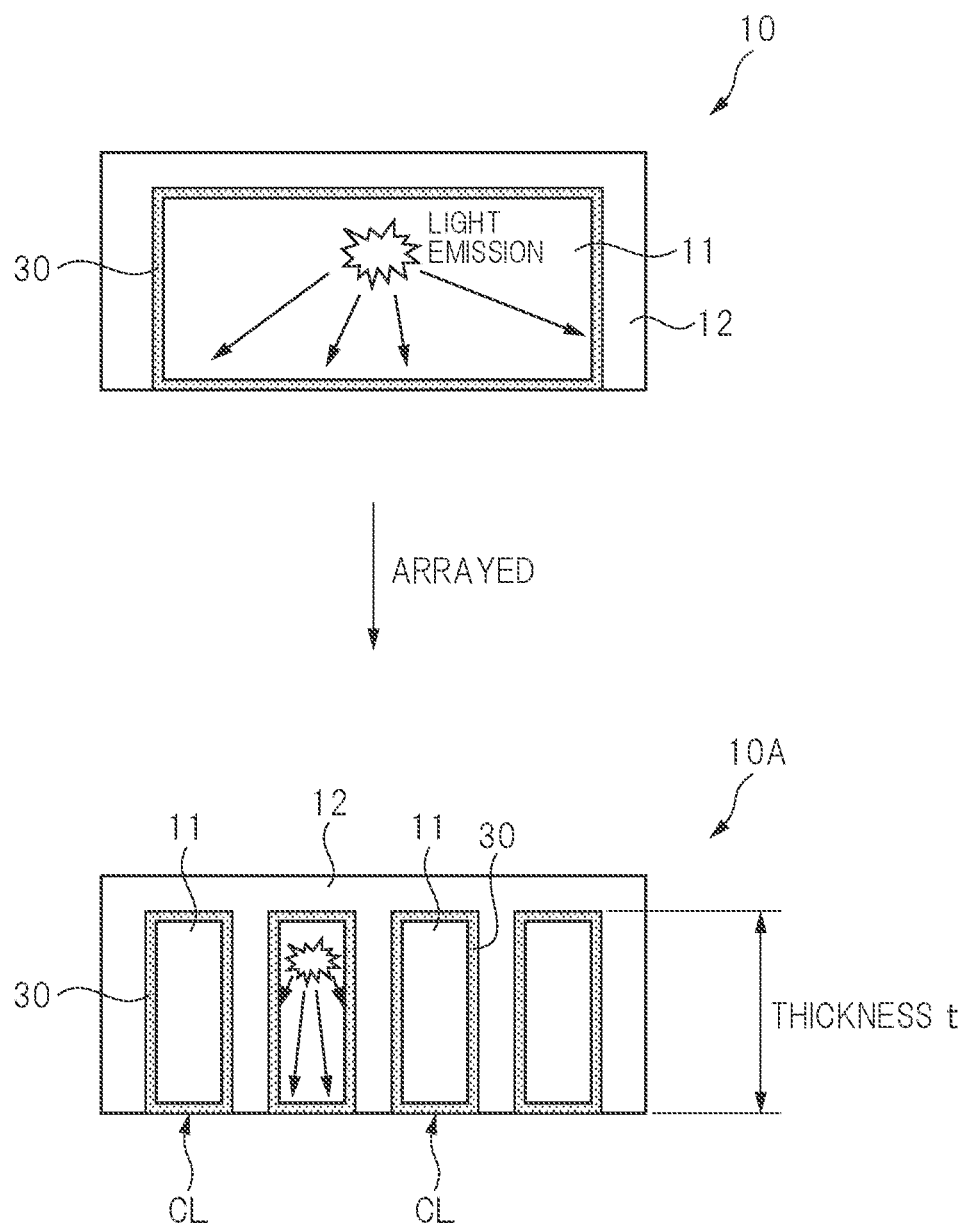
FIG. 2 is a diagram for explaining one of causes of a decrease in a light-emission output in "resin GOS"

For example, as shown in FIG. 2, the scintillator structure 10 is configured by a rectangular parallelepiped scintillator 11 and a reflector 12 that covers the scintillator 11. Here, since the rectangular parallelepiped scintillator 11 is formed through processing steps such as a dicing step and a grinding step, a processed surface(s) is formed on the surface of the rectangular parallelepiped scintillator. That is, the "processed surface" means a surface that has been mechanically processed. Specifically, the "processed surface" includes a surface ground with a grinding wheel in thickening a work-piece, or a surface cut with a slicing blade to perform a dicing processing. For example, in the scintillator 11 using the "resin GOS", the "processed surface" is defined as a surface mixed by a surface in which a resin is exposed and a surface in which the "GOS" powder is broken. For example, a broken line shown in FIG. 1 schematically illustrates a case where an interface between the scintillator 11 and the reflector 12 is the "processed surface" in the scintillator 11 using the "resin GOS". In this case, it can be understood in the "processed surface" that a region of cutting the resin 11b and a region of the phosphor 11a ("GOS" powder) being broken are mixed. Incidentally, the broken line shown in FIG. 1 is drawn to make a composition of the "processed surface" easily understood, and is not intended to shrink the scintillator 11 by the broken line. A size of the scintillator 11 surrounded by the broken line may be a size enclosed by a solid line.

Since this processed surface receives mechanical damage due to processing steps, it becomes a work-affected layer 30. The "work-affected layer" is defined as a layer that is subjected to mechanical damage due to a mechanical processing step, whose light reflection characteristics after the mechanical step consequently deteriorate further than those before the mechanical step, and in which light becomes more easily absorbed. For example, as a specific example of the "work-affected layer", a light absorption layer by desulfurization of sulfur components of the surface of the "GOS" powder can be recited.

In this work-affected layer 30, visible light generated by the scintillator 11 becomes easily absorbed. That is, a part of the generated visible light is absorbed by the work-affected layer 30 existing in the scintillator 11 and, as a result, the light-emission output is lowered. Namely, formation of the work-affected layer 30 on the surface of the scintillator 11 is one cause of lowering the light-emission output from the scintillator structure 10.

In particular, in recent years, as shown in FIG. 2, from the viewpoint of improving resolution of an X-ray image, the scintillator 11 is divided into a plurality of cells CL according to each of a plurality of photodiodes (array of scintillator 11). Then, the reflector 12 is provided so as to cover the plurality of cells CL. Specifically, a top surface and four side surfaces of the cell CL are covered with the reflector 12. Meanwhile, a lower surface of the cell CL is not covered with the reflector 12 because needing to contact with the photodiode.

When the scintillator 11 is divided into the plurality of cells CL, the work-affected layer 30 is formed on a surface of each of the plurality of cells CL, so that an area of the work-affected layer 30 in the scintillator structure 10A becomes large. As a result, in the multi-cell type scintillator structure 10A, the decrease in the light-emission output due to the work-affected layer 30 is considered to become large.

The scintillator structure in the present embodiment is premised on the multi-cell type scintillator structure 10A capable of improving the resolution of the X-ray image. Thus, the decrease in the light-emission output due to the work-affected layer 30 is thought to become large, so that creating a devisal for maintaining the light-emission output is considered to be important.

Here, regardless of whether the "GOS" ceramic or the "resin GOS" is used as the scintillator 11, the work-affected layer 30 is still formed on the surface of the scintillator 11. Therefore, regardless of whether the scintillator 11 is made of the "GOS" ceramic or the "resin GOS", the decrease in the light-emission output due to the work-affected layer 30 is considered to be caused.

In this regard, according to the consideration of the present inventors, the present inventors have newly found that a case of making the scintillator 11 of the "resin GOS" is larger in the decrease in the light-emission output due to the work-affected layer 30 than a case of making the scintillator 11 of the "GOS" ceramic.

This reason will be described below. For example, the "GOS" ceramic can be heat-treated even after being individualized into the cells CL. The heat treatment has a function of recovering the work-affected layer 30 formed by the mechanical damage. Therefore, when the scintillator 11 is made of the "GOS" ceramic, it is individualized into the cells CL and is then heat-treated, thereby making it possible to recover the work-affected layer 30 formed on a surface of each cell CL. Thus, when the scintillator 11 is made of the "GOS" ceramic, the work-affected layer 30 is reduced by the heat treatment, so that the decrease in the light-emission output due to the work-affected layer 30 can be suppressed.

In contrast, the "resin GOS" is not ceramics but the "GOS" powder hardened with a resin, which makes it difficult to heat-treat the "resin GOS". As a result, when the scintillator 11 is made of the "resin GOS", a recovery effect of the work-affected layer 30 by the heat treatment cannot be obtained, so that the decrease in the light-emission output due to the work-affected layer 30 becomes large. In other words, unlike the "GOS" ceramic, the "resin GOS" is difficult to heat-treat and the work-affected layer 30 cannot be recovered, which is a second cause of lowering the light-emission output from the scintillator structure 10A.

From the above, if the scintillator 11 is made of the "resin GOS", it is lower in the light-emission output than the "GOS" ceramic for synergistic factors of the first cause due to the use of "GOS" powder and the second cause of difficulty of the recovery of the work-affected layer 30.

Therefore, the use of the "resin GOS" as the scintillator 11 cannot avoid essentially making the scintillator lower in the light-emission output than the "GOS" ceramic. However, the present inventors have acquired a novel finding of the light-emission output being changed depending on thickness and density of each cell CL configured from the "resin GOS" in using the "resin GOS" as the scintillator 11. That is, the novel finding found by the present inventors is considered to be able to ensure the light-emission output of the scintillator beyond a certain extent by defining (adjusting) the thickness and density of each cell CL even when the "resin GOS" is used as the scintillator.

Therefore, thickness dependence and density dependence of the light-emission output will be described below.

Thickness Dependence of Light-emission Output

Figure 3:
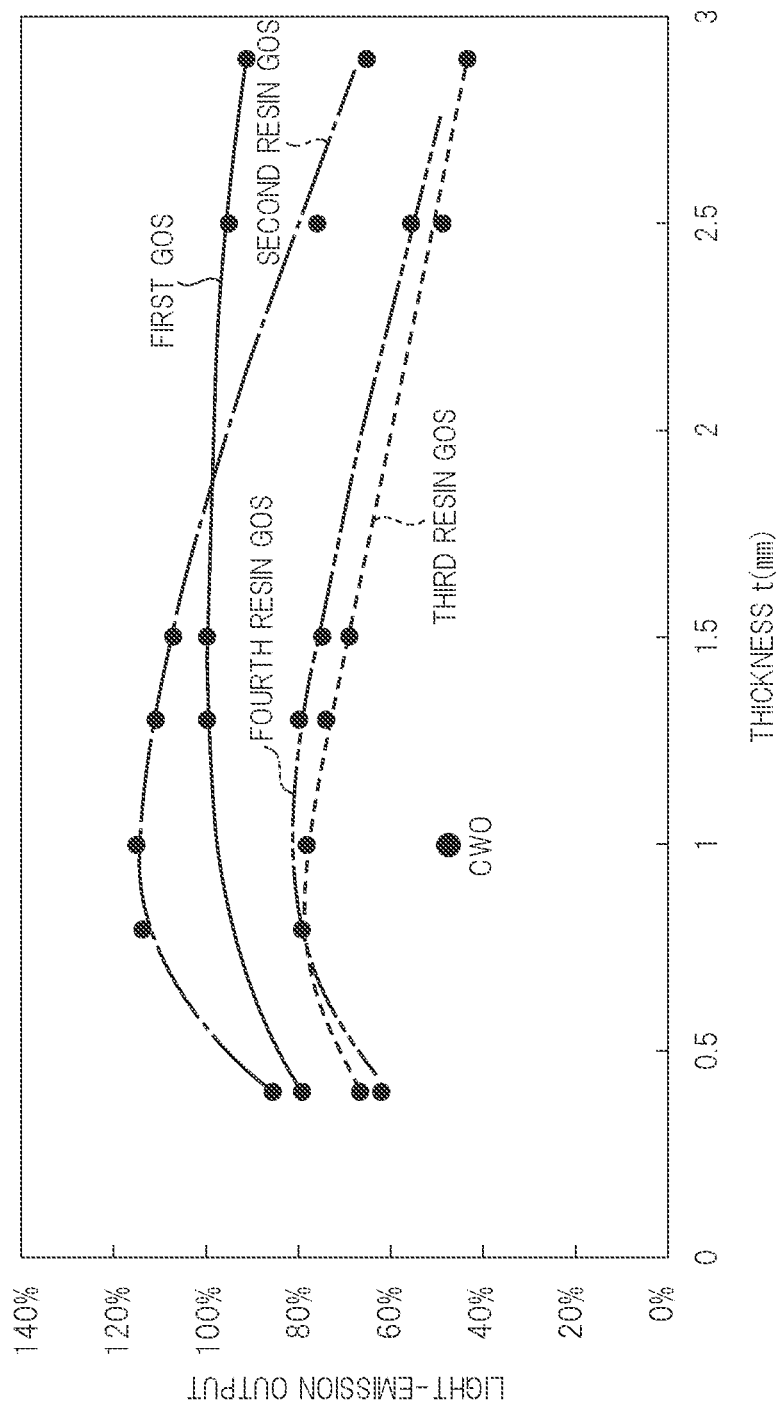
FIG. 3 is a graph showing a relationship between cell's thickness and the light-emission output.

FIG. 3 is a graph showing a relationship between cell's thickness and a light-emission output.

In FIG. 3, a horizontal axis represents cell's thickness and a vertical axis represents a light-emission output.

First, "first GOS" is "GOS" to which praseodymium (Pr) and cerium (Ce) are added. Meanwhile, although not shown in FIG. 3, "second GOS" is "GOS" to which terpium (Tb) and cerium (Ce) are added.

Here, focusing on light-emission outputs of the "first GOS" and "second GOS", the light-emission output of the "second GOS" is higher than that of the "first GOS". In other words, the "first GOS" has a lower light-emission output than the "second GOS". Incidentally, a light-emission output shown on the vertical axis of FIG. 3 is expressed in a percentage on the premise that the light-emission output of the "first GOS" is expressed in 100 percentages when having a thickness of 1.3 mm.

"Second resin GOS" is a mixture of the "GOS" powder composed of the "second GOS" and the epoxy resin.

"Third resin GOS" and "fourth resin GOS" are both a mixture of "GOS" powder composed of the "first GOS" and an epoxy resin, and the "third resin GOS" is different from the "fourth resin GOS" in density.

Focusing on a curve of the "first GOS" in FIG. 3, it can be understood that the light-emission output of the "first GOS" hardly depends on the cell's thickness. Meanwhile, focusing on curves of the "second resin GOS" to "fourth resin GOS" in FIG. 3, it can be understood that each light-emission output of the "second resin GOS" to "fourth resin GOS" depends on the cell's thickness.

In the following, the thickness dependence of the light-emission output of each of the "second resin GOS" to "fourth resin GOS" will be qualitatively explained. First, in a range in which the thickness is thin, the light-emission output increases as the thickness increases. This can be understood, in the range in which the thickness is thin, from an increase in an amount of "resin GOS" that contributes to absorbing incident x-rays and generating visible light as the thickness becomes large. Then, the followings can be understood: when the thickness increases to some extent, the amount of "resin GOS" that contributes to absorbing the incident X-rays and generating the visible light is saturated, while when the thickness becomes large, translucency decreases and the first cause and the second cause described above become apparent, which brings the decrease in the light-emission output as the thickness becomes large.

Density Dependence of Light-Emission Output

Next, density dependence of the light-emission output will be described.

Figure 4:
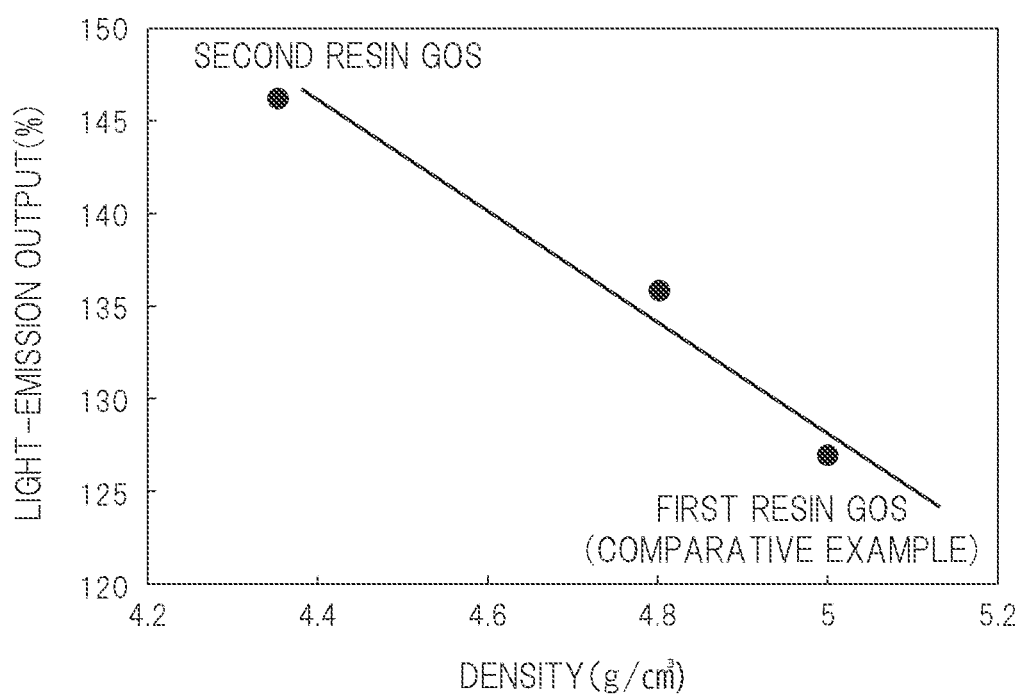
FIG. 4 is a graph showing a relationship between density of the cell itself and the light-emission output.

FIG. 4 is a graph showing a relationship between density of a cell itself and a light-emission output.

In FIG. 4, a horizontal axis shows density of a scintillator constituting a cell, and a vertical axis shows a light-emission output. Incidentally, the light-emission output on the vertical axis is expressed in a percentage on the premise that a light-emission output of "first GOS" having a thickness of 1.5 mm is 100%.

Here, "density" means density of the entire "resin GOS". In particular, in the "resin GOS", since density of "GOS" powder is higher than that of an epoxy resin, the following relationship is established.

That is, the low density of the "resin GOS" means that an amount of "GOS" powder is small and an amount of epoxy resin is large. In other words, the high density of "resin GOS" means that the amount of "GOS" powder is large and the amount of epoxy resin is small.

In FIG. 4, density of "first resin GOS" (comparative example) is 5.0 (g/cm$^3$), while density of "second resin GOS" is 4.4 (g/cm$^3$). That is, the density of the "second resin GOS" is lower than the density of the "first resin GOS". In other words, the density of the "first resin GOS" is higher than the density of the "second resin GOS".

As shown in FIG. 4, it can be seen that the light-emission output increases as the density decreases. This means that the low density indicates that the amount of epoxy resin, which has higher translucency than the "GOS" powder, becomes relatively large. Accordingly, it can be thought from a reduction in absorption of visible light that the reduction in the density brings the increase in the light-emission output. In other words, the followings can be thought: the increase in the density means that the amount of "GOS" powder is larger than the amount of epoxy resin having high translucency, so that from an increase in the absorption of visible light in the "GOS" powder, the increase in the density brings the decrease in the light-emission outputs.

In the following, described will be a devisal for improving performance of the scintillator structure 10A based on the thickness dependence of the light-emission output (see FIG. 3) and the density dependence of the light-emission output (FIG. 4) while the manufacturing cost by making the scintillator 11 of the "resin GOS" is further reduced than that by using the "GOS" ceramic as the scintillator 11. In other words, described will be a devisal point for improving cost performance of the scintillator structure 10A.

Specifically, the devisal point for improving the performance of the scintillator structure 10A will be described as a first devisal point from the viewpoint of ensuring the light-emission output and a second devisal point from the viewpoint of ensuring the afterglow characteristics.

Viewpoint of Ensuring Light-Emission Output
(First Devisal Point)

As shown in FIG. 3, looking at the thickness dependence of the light-emission output in the "second resin GOS", for example, when the thickness is 0.5 mm or more and 1.8 mm or less, the light emission output of the "second resin GOS" is higher than the light-emission output of the "first GOS". In other words, the followings are understood: the "second resin GOS" formed by mixing the epoxy resin with the "GOS" powder, which is made of the "second GOS" having a larger light-emission output than the "first GOS", is lower in the light-emission output than the "second GOS", but setting the cell's thickness within a range of 0.5 mm or more and 1.8 mm or less can make the light-emission output higher than that of the "first GOS". Namely, if the thickness of the cell made of the "second resin GOS" is set in the range of 0.5 mm or more and 1.8 mm or less, the light-emission output of the "second resin GOS" can be made equal to or greater than that of the "first GOS".

Next, as shown in FIG. 4, it can be seen that the light-emission output is improved as the density of the cell itself decreases. In particular, it can be seen that when the density is set within a range of 4.4 g/cm$^3$ or more and less than 5.0 g/cm$^3$, the light-emission output of "125% or more" can be obtained on the premise that the light-emission output of the "first GOS" having a thickness of 1.5 mm is set at "100%".

From the foregoing, by setting the cell's thickness within a range of 0.5 mm or more and 1.8 mm or less and setting the density of the cell itself within a range of 4.4 g/cm$^3$ or more and less than 5.0 g/cm$^3$ on the premise that the "resin GOS" mixing the "GOS" powder made of the "second GOS" with the epoxy resin is used as the scintillator 11, even the "resin GOS" can obtain a light-emission output(s) equal to or more than that of the "first GOS". In this way, while the "resin GOS" capable of reducing the manufacturing cost is used, setting a thickness range and a density range to the above-mentioned ranges makes it possible to obtain a light-emission output(s) equal to or more than that of the "first GOS". That is, ensuring the light-emission output while the "resin GOS" that can reduce the manufacturing cost is used can be achieved by setting the cell's thickness within the range of 0.5 mm or more and 1.8 mm or less and by setting the density of the cell itself within the range of 4.4 g/cm$^3$ or more and less than 5.0 g/cm$^3$.

Viewpoint of Ensuring Afterglow Characteristics (Second Devisal Point)

The first devisal point mentioned above is a devisal point from the viewpoint of ensuring the light-emission output. In contrast, a second devisal point to be explained below is a devisal point from the viewpoint of ensuring afterglow characteristics. That is, the performance of the scintillator structure 10A is required not only to have a large light-emission output but also to have good afterglow characteristics. Therefore, first, the afterglow characteristics will be described.

The scintillator 11 constituting the scintillator structure 10A is a substance that generates visible light by applying X-rays. In the scintillator 11, a mechanism for generating the visible light by applying the X-rays is as follows. That is, when the scintillator 11 is irradiated with the X-rays, electrons in the scintillator 11 receive energy from the x-rays and transition from a low-energy ground state to a high-energy excited state. Then, the electrons in the excited state transition to a ground state(s) with low energy. At this time, most of the excited electrons immediately transition to the ground state. Meanwhile, some of the excited electrons transition to the ground state after a certain period of time. Visible light generated by the transition from the excited state of the electrons to the ground state, which occurs after this certain period of time elapses, becomes afterglow. Namely, the afterglow is visible light generated when timing of transition from the excited state to the ground state occurs after a certain period of time has passed from time of irradiating the X-ray. Then, that this afterglow is large means that intensity of visible light generated until the certain period of time has passed from the irradiation of the X-rays is large. In this case, the afterglow generated by the previous X-ray irradiation remains until the next X-ray irradiation, and the remaining afterglow becomes noise. Accordingly, from this, it is desirable that the afterglow is small. That is, good afterglow characteristics mean that the afterglow is small.

Figure 5:
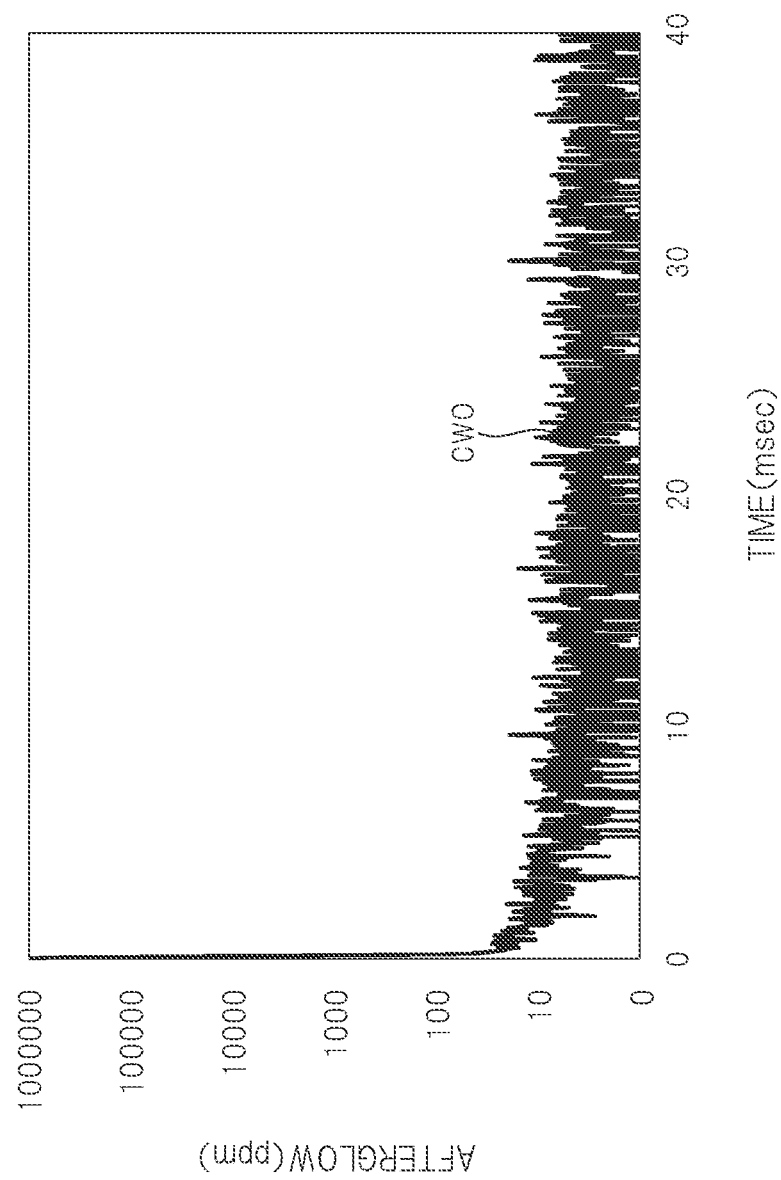
FIG. 5 is a graph showing afterglow characteristics of "CWO"
Figure 6:
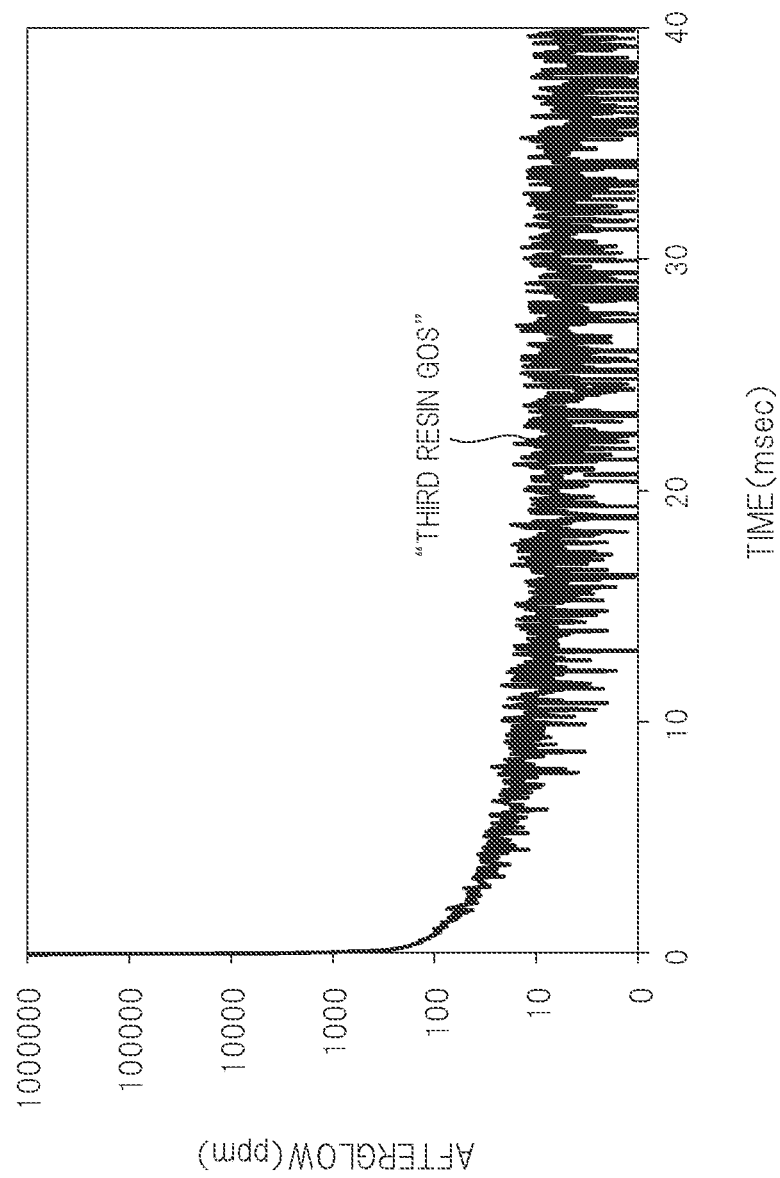
FIG. 6 is a graph showing afterglow characteristics of "third resin GOS"

Here, the afterglow characteristics differ depending on a type of the scintillator 11. For example, FIG. 5 is a graph showing afterglow characteristics of "CWO", and FIG. 6 is a graph showing afterglow characteristics of "third resin GOS". Further, FIG. 7 is a graph showing afterglow characteristics of "first resin GOS".

Figure 7:
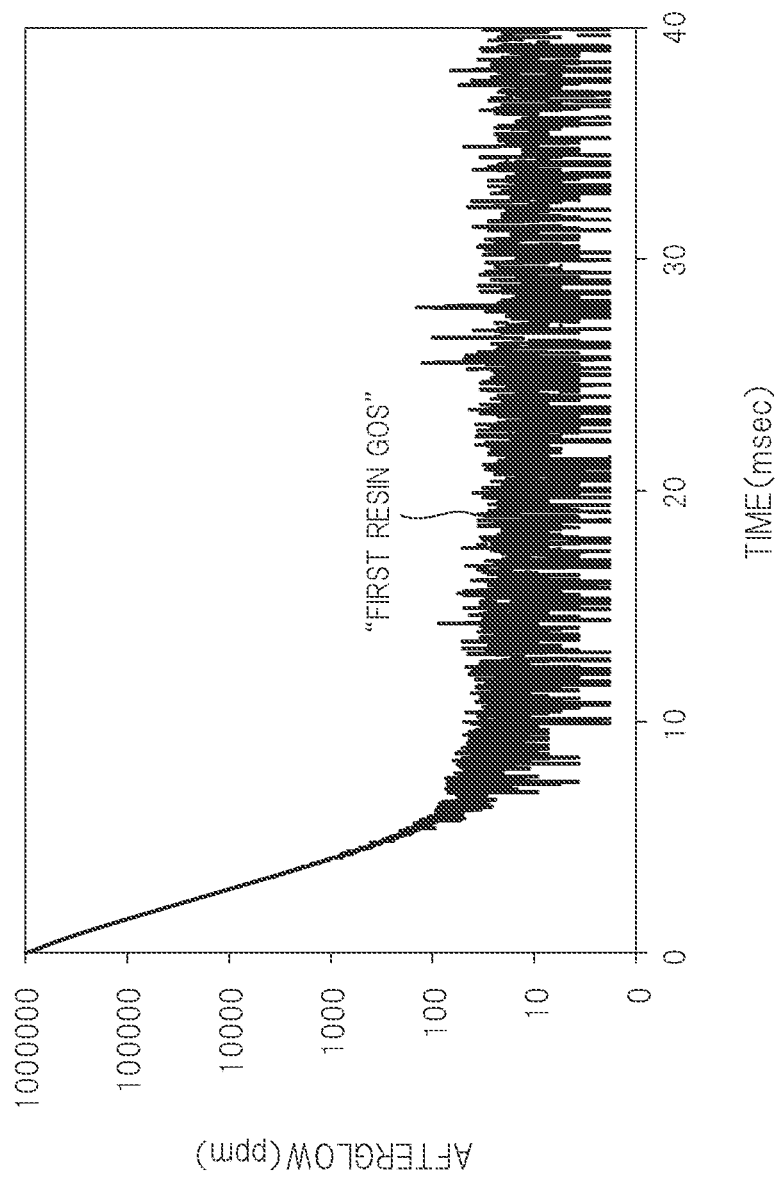
FIG. 7 is a graph showing afterglow characteristics of "first resin GOS"

In each of FIGS. 5 to 7, a vertical axis shows intensity of afterglow, while a horizontal axis shows time. Each of FIGS. 5 to 7 shows that the greater the intensity of the afterglow after passage of time, the worse the afterglow characteristics. In other words, each of FIGS. 5 to 7 shows that the smaller the intensity of the afterglow after the passage of time, the better the afterglow characteristics.

Focusing on this point and looking at FIGS. 5 to 7, it is understood that the afterglow characteristics of FIG. 5 and the afterglow characteristics of FIG. 6 are almost the same and the afterglow characteristics are good, while the afterglow characteristics of FIG. 7 are bad. That is, it is understood that the afterglow characteristics of the "CWO" shown in FIG. 5 and the afterglow characteristics of the "third resin GOS" shown in FIG. 6 are both good, while the afterglow characteristics of the "first resin GOS" shown in FIG. 7 are bad.

In other words, from the viewpoint of the light-emission output, if the above-mentioned first devisal point is realized, there is an area where the following relationship is established: "second GOS">"second resin GOS">"first resin GOS">"first GOS">"fourth resin GOS">"third resin GOS">"CWO".

In contrast, referring to FIGS. 5 to 7, a relationship of "CWO"≈"third resin GOS"<"first resin GOS" is established from the viewpoint of afterglow characteristics.

Therefore, for example, focusing on the "first resin GOS", "third resin GOS", and "CWO", the "first resin GOS" is the most excellent from the viewpoint of the light-emission output. In contrast, from the viewpoint of the afterglow characteristics, the "CWO" and "third resin GOS" are excellent.

From this, in order to realize the "resin GOS" with the excellent afterglow characteristics, it is understood that the "third resin GOS" or "fourth resin GOS" which mixes the epoxy resin with the "GOS" powder made of the "first GOS" is better than the "first resin GOS" or "second resin GOS" which mixes the epoxy resin with the "GOS" powder made of the "second GOS". However, as shown in FIG. 3, the "third resin GOS" and the "fourth resin GOS" are lower in the light-emission output than the "second resin GOS".

Therefore, it is desired to increase the light-emission output as much as possible while the afterglow characteristics are ensured by adopting the "third resin GOS" and the "fourth resin GOS". In this regard, the followings are thought: on the premise of using the "resin GOS" which mixes the epoxy resin with the "GOS" powder made of the "first GOS" in FIG. 3, setting the cell's thickness within a range of 0.3 mm or more and 2.5 mm or less and setting the density of the cell itself within a range of 4.4 g/cm$^3$ or more and 5.0 g/cm$^3$ or less by analogy with FIG. 4 do not extend the light-mission output of the "second GOS", but can obtain a light-emission output equal to or more than the light-emission output of the "CWO". In this way, while the manufacturing costs can be reduced and the "resin GOS" with the good afterglow characteristics is used, setting the thickness range and density range to the above-mentioned ranges can obtain a light-emission output equal to or more that the light-emission output of the "CWO". That is, ensuring the light-emission output while the manufacturing cost can be reduced and the "resin GOS" with the good afterglow characteristics is used can be realized by setting the cell's thickness within the range of 0.3 mm or more and 2.5 mm or less and setting the density of the cell itself within the range of 4.4 g/cm$^3$ or more and 5.0 g/cm$^3$ or less.

Manufacturing Method of Scintillator Structure

Subsequently, a manufacturing method of the scintillator structure 10 will be described.

Figure 8:
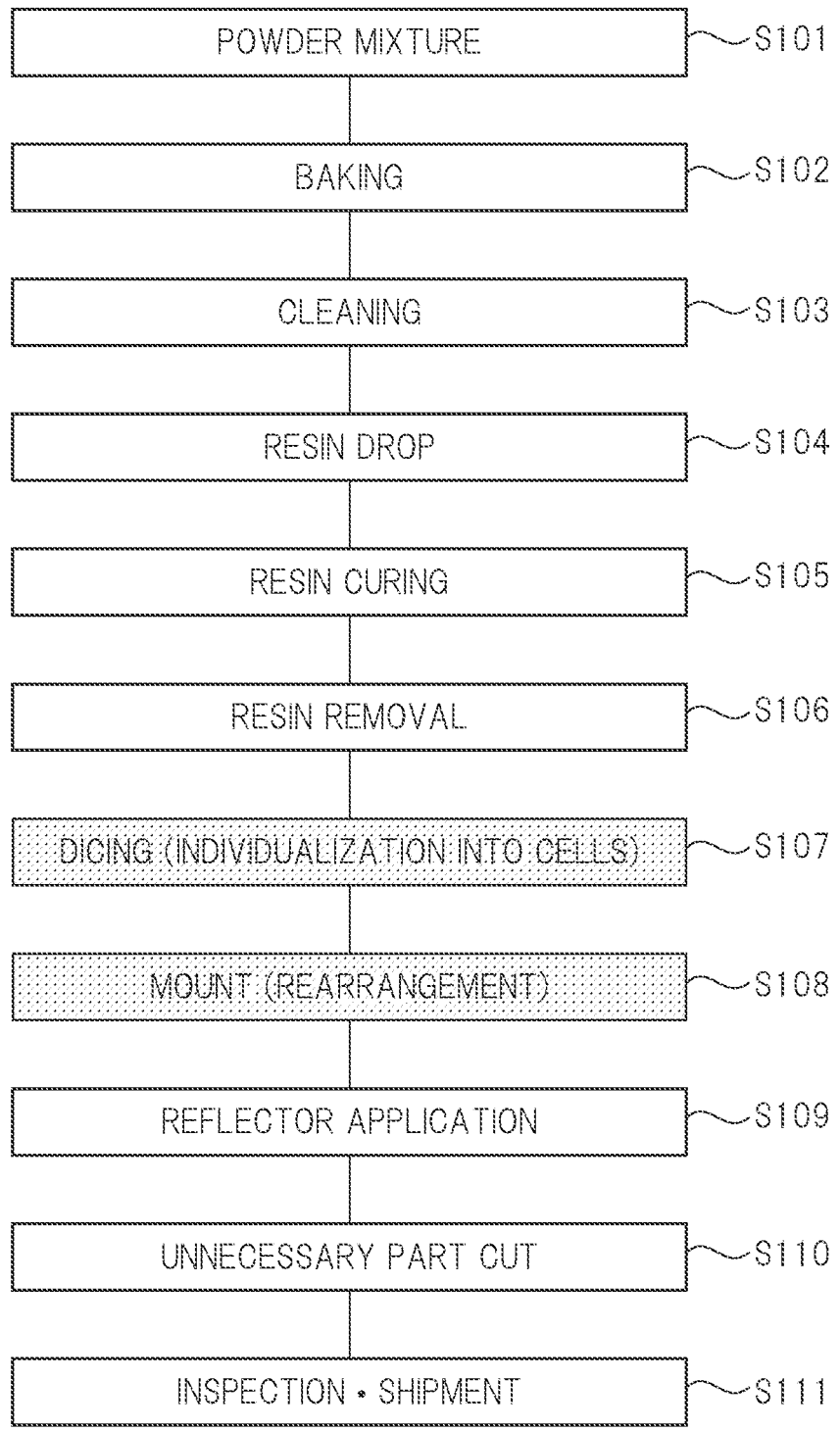
FIG. 8 is a flowchart for explaining a flow of a manufacturing process of a scintillator structure.

FIG. 8 is a flowchart for explaining a flow of a manufacturing process of a scintillator structure.

In FIG. 8, first, a predetermined amount of raw powder and a predetermined amount of flux component are weighed and mixed (S101), and this mixture is then filled in a crucible and baked in an air furnace at 1300° C. to 1400° C. for 7 to 9 hours (S102), which produces "GOS" powder. Then, the flux component and impurities contained in the "GOS" powder are removed by washing with hydrochloric acid and warm water (S103). Next, an epoxy resin is impregnated into the "GOS" powder by dropping the epoxy resin into the "GOS" powder (S104). Next, after the epoxy resin is cured (S105), the epoxy resin that is not mixed with the "GOS" powder is removed (S106). Thus, a scintillator made of the "resin GOS" can be formed.

Subsequently, a substrate on which the scintillator is formed is diced to individualize the substrate into a plurality of cells (S107). A plurality of individualized cells are rearranged (S108), and a reflector is then applied so as to cover the plurality of cells (S109). Then, after an unnecessary part as a scintillator structure 10A is cut (S110), the scintillator structure 10A that has passed inspection is shipped (S111).

Figure 9:
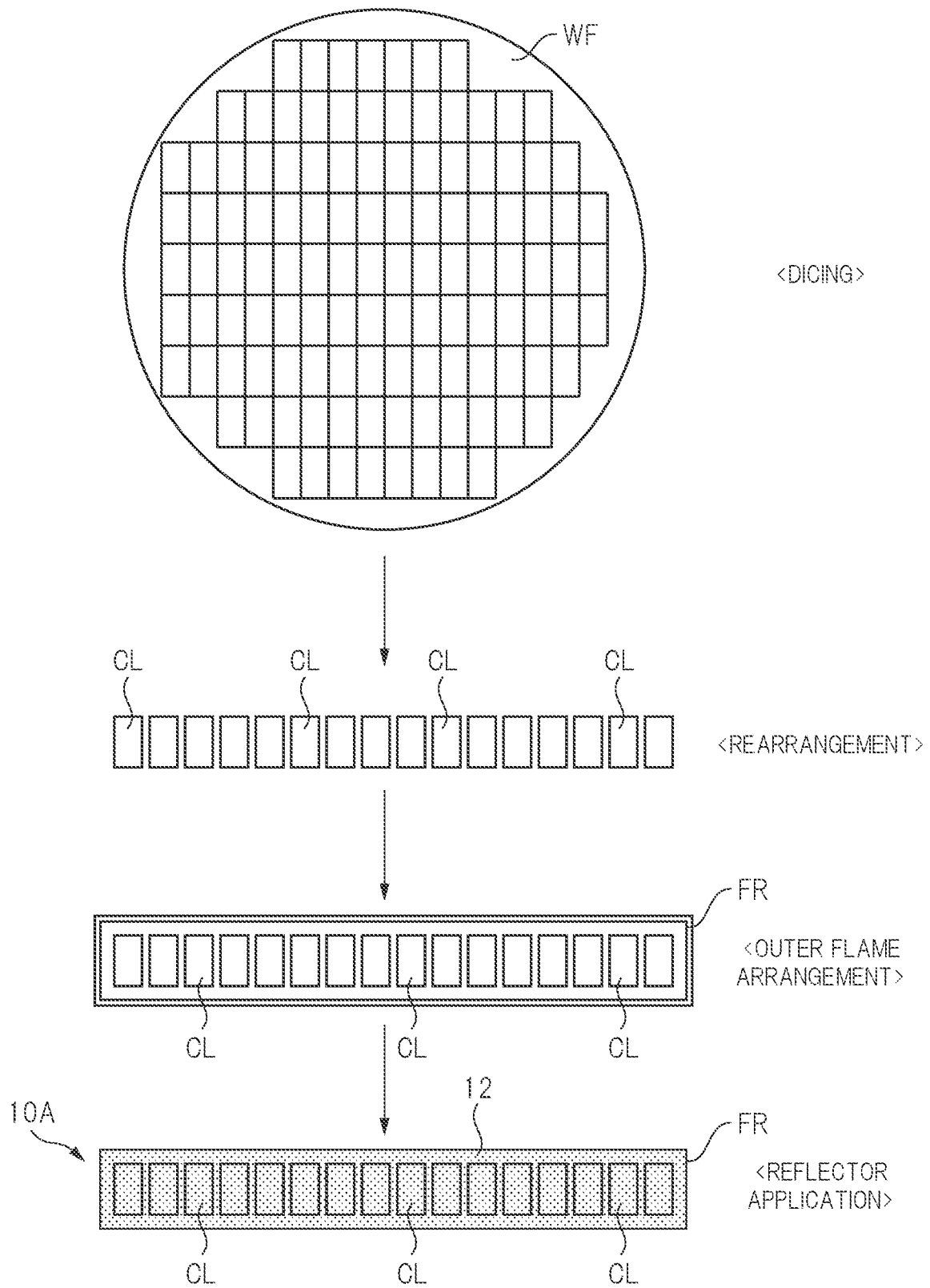
FIG. 9 is a diagram schematically showing a process from a dicing step to a reflector applying step.

FIG. 9 is a diagram schematically showing a process from a dicing step to a reflector applying step.

As shown in FIG. 9, by dicing a substrate WF on which a scintillator made of "resin GOS" is formed, the substrate WF is separated (individualized) into a plurality of cells CL. Then, the plurality of individualized cells CL are rearranged in, for example, a line. Thereafter, an outer frame FR is arranged so as to include the plurality of cells CL rearranged in a line. Next, a reflector 12 made of, for example, a titanium oxide-containing epoxy resin is applied so as to cover the plurality of cells CL arranged in the outer frame FR. Thereafter, the outer frame FR is removed. In this way, the scintillator structure 10A is manufactured.

Incidentally, in FIG. 9, the line-shaped scintillator structure 10A using 1×n cells is described as an example, but the technical idea in the present embodiment is not limited to this and, for example, is also applicable to an array-like (matrix-like) scintillator structure using n×n cells.

Characteristics of Manufacturing Method

Next, a feature point(s) of the manufacturing method in the present embodiment will be described.

A feature point(s) of the manufacturing method in the present embodiment is to: completely individualize the substrate WF, on which the scintillator 11 is formed, into the plurality of cells CL by full-cut dicing; then rearrange the plurality of individualized cells CL; apply the reflector 12 so as to cover the plurality of rearranged cells CL; and manufacture the scintillator structure 10A.

According to the present embodiment, this makes it possible to freely adjust an interval (distance) between the cells.

For example, there is a technique in which: the substrate WF on which the scintillator 11 is formed is half-diced partway; then the reflector 12 is applied thereto; and then the half-diced substrate WF is ground to separate the cells CL adjacent to each other. According to this technique, since the distance between the cells CL adjacent to each other is determined by a cutting width of the half dicing, the distance between the cells CL adjacent to each other can be determined with good accuracy. This means that, to put it the other way around, this technique does not allow the distance between the cells CL to change freely.

In this regard, for example, some users of an x-ray detector want to arrange photodiodes, which is a light receiving element, at high density and acquire a high-definition x-ray image, while the other of users want to arrange the photodiodes at low density and acquire an x-ray image(s) that has no high-definition but a wide range. In the former case, the plurality of cells CL constituting the scintillator structure 10A also need to be arranged at high density correspondingly to the photodiodes arranged at high density. In this case, the distance between the cells CL needs to be very small. For example, when the distance between the cells CL is made smaller than a cutting width of the half dicing, this cannot be applied in a technique of using the half dicing. Meanwhile, in the latter case as well, even if the distance between the cells CL is desired to be larger than a width of the half dicing, this cannot be applied in a technique of using the half dicing. In this way, in the technique of using the half dicing, the distance between the cells CL is uniformly determined by a cutting width of the half dicing, so that the distance between the cells CL cannot be freely adjusted according to a user's request.

In contrast, in the present embodiment, the substrate WF on which the scintillator 11 is formed is individualized into the plurality of cells CL by the full-cut dicing instead of the half dicing, and then the individualized cells CL are rearranged. According to the present embodiment, this makes it possible to freely set the distance between the adjacent cells CL in rearranging the plurality of cells CL.

From this, according to the present embodiment, since the distance between the cells CL can be made smaller or larger than the cutting width of the dicing, the following advantage can be obtained: the scintillator structure 10A that meets needs of the user can be flexibly manufactured.

Further, according to the present embodiment, the following advantage can also be obtained. That is, in the technique of using the half dicing, the cells CL are finally separated by a grinding step.

In this regard, in the present embodiment, the plurality of cells CL are individualized by the full-cut dicing. From this, the grinding step of separating the plurality of cells CL in the subsequent step is made unnecessary. This means that the grinding step of separating the plurality of cells CL can be reduced. As a result, the manufacturing method of the scintillator structure 10A in the present embodiment can also obtain the following advantage: the manufacturing process can be simplified.

Viewpoint of Improving Adhesion Properties (Third Devisal Point)

For example, a constant temperature and high humidity test is performed to the scintillator structure 10A in order to ensure the reliability, the scintillator structure being a finished product manufactured through the above-mentioned manufacturing process.

Here, when the constant temperature and high humidity test has been performed to the scintillator structure 10A using the "resin GOS" for the scintillator 11, a decrease of a rate of passing the constant temperature and high humidity test has been confirmed. In this regard, the present inventors have newly found that the rate of passing the constant temperature and high humidity test decreases due to a decrease in an adhesive force of an interface between the scintillator 11 made of the "resin GOS" and the reflector 12. Therefore, from the viewpoint of improving the reliability of the scintillator structure 10A, a devisal point is implemented to the present embodiment to improve the adhesion properties between the scintillator 11 made of the "resin GOS" and the reflector 12. In the following, this devisal point will be described.

Novel Finding

First, a novel finding(s) found by the present inventors will be described.

The novel finding found by the present inventor is that when a surface of "resin GOS" is surface-treated before the reflector 12 is applied so as to cover the scintillator 11 made of the "resin GOS", the adhesive force of the interface between the "resin GOS" and the reflector 12 is different depending on a type of surface treatment. Additionally, the present inventors presume that a cause of bringing the difference in the adhesive force of the interface between the "resin GOS" and the reflector 12 is due to a change in the wettability to the reflector 12 depending on the type of surface treatment with respect to the surface of the "resin GOS". From this, it is thought that if the surface treatment that can improve the wettability of the reflector 12 is applied to the surface of the "resin GOS", the adhesive force of the interface between the "resin GOS" and the reflector 12 can be improved. That is, it is thought that if a surface treatment layer is formed on a surface(s) contacting with the reflector 12 among surfaces of the plurality of cells CL, the adhesive force of the interface between the "resin GOS" and the reflector 12 can be improved. For example, it is thought that the adhesive force can be improved by forming the surface treatment layers on at least a side surface and an upper surface of each of the plurality of cells CL.

Accordingly, the wettability to the epoxy resin with respect to the various surface treatments has been evaluated.

Figure 10:
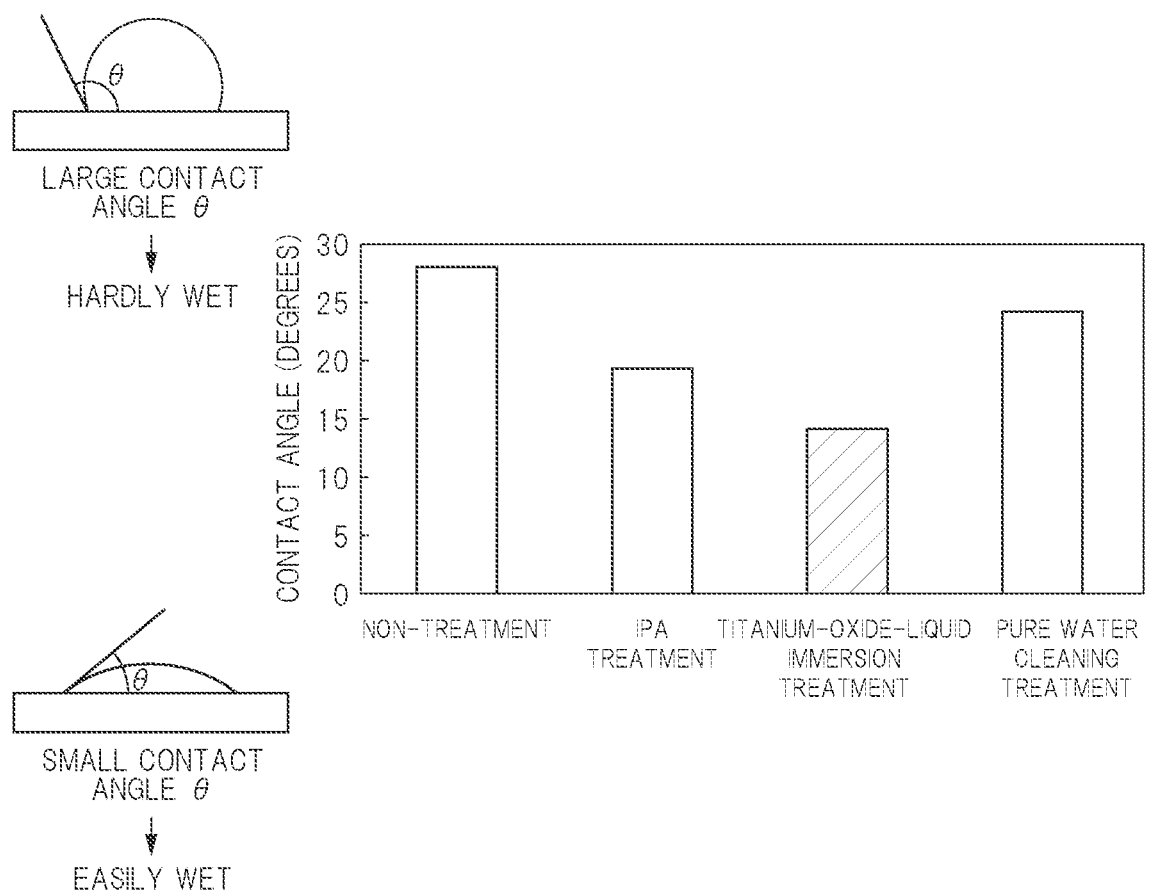
FIG. 10 is a graph showing results of evaluations of wettability with respect to an epoxy resin by performing various surface treatments to a surface of "resin GOS" and then comparing contact angles when the epoxy resin is dropped on a surface of the "resin GOS"

FIG. 10 is a graph showing results in which wettability to an epoxy resin is evaluated by comparing contact angles in dropping the epoxy resin on a surface of "resin GOS" after various surface treatments are applied to the surface of the "resin GOS".

In FIG. 10, various surface treatments include a non-treatment, an IPA treatment (isopropyl alcohol drying), a titanium-oxide-liquid immersion treatment, and a pure water cleaning treatment.

As shown in FIG. 10, it can be seen that a contact angle differs depending on a difference in a surface treatment. This means that the wettability varies depending on the type of surface treatment.

Then, from results shown in FIG. 10, the following is understood after the titanium-oxide-liquid immersion treatment is performed on the surface of the "resin GOS": the contact angle when the epoxy resin is dropped on the surface of the "resin GOS" is the smallest. This means that the wettability to the epoxy resin is most improved by performing the titanium-oxide-liquid immersion treatment as the surface treatment.

Therefore, it is presumed that when the titanium-oxide-liquid immersion treatment, which has the best wettability with respect to the epoxy resin, is carried out, the adhesive force of the interface between the "resin GOS" and the reflector 12 becomes high. Namely, as shown in FIG. 11, the following is thought: when the titanium-oxide-liquid immersion treatment is performed, the wettability is improved by adhering titanium oxide to the surface of the scintillator 11 made of the "resin GOS" and a contacting area between the scintillator 11 and the reflector 12 increases, which consequently brings an increase in the adhesive force of the interface between the scintillator 11 made of the "resin GOS" and the reflector 12.

From the foregoing, the devisal point for improving the adhesion properties between the scintillator 11 made of the "resin GOS" and the reflector 12 is to perform, to the surface of the scintillator 11, the surface treatment for improving the wettability to the reflector 12 before the reflector 12 is applied so as to cover the scintillator 11. Specifically, this devisal point is realized by performing the titanium-oxide-liquid immersion treatment onto the surface of the scintillator 11 before the reflector 12 is applied so as to cover the scintillator 11.

Verification of Effect

In the following, explained will be a verification result(s) indicating that the following is supported: the adhesive force of the interface between the scintillator 11 and the reflector 12 becomes high by performing the titanium-oxide-liquid immersion treatment to the surface of the scintillator 11 before the reflector 12 is applied so as to cover the scintillator 11 made of the "resin GOS".

The present inventors think that the adhesive force of the interface between the scintillator 11 and the reflector 12 can quantitatively be compared with a breaking strength of a bending test. Consequently, since the adhesive force of the interface between the scintillator 11 and the reflector 12 is evaluated by the bending test, the evaluation results by this bending test will be explained. Specifically, in the present embodiment, the adhesive force has been evaluated by the bending test based on a 3-point bending test specified in "JIS K7171". For example, in a figure shown in "JIS K7171", a load at which a sample is broken has been measured under conditions shown below.

Sample shape (length, thickness, width): 50 mm×6.2 mm×1.2 mm
Tip radius of Indenter ($R_1$): 0.3 mm
Radius of corner of support base ($R_2$): 0.3 mm
Thickness of specimen (sample) (h): 6.2 mm
Length of specimen (sample) (l): 50 mm
Distance between fulcrums (L); 10 mm 1. Manufacture of Sample FIG. 12A is a cross-sectional view schematically showing a manufacturing process of a sample to be evaluated by a bending test, and FIG. 12B is a top surface schematically showing the manufacturing step of the sample to be evaluated in the bending test.

As shown in FIG. 12A, a scintillator structure 10A configured to cover a plurality of arranged scintillators 11 with a reflector 12 is prepared, and an upper surface of the scintillator structure 10A is ground. In addition to this, as shown in FIG. 12B, a sample SP is manufactured by grinding two side surfaces (long side) of the scintillator structure 10A.

Then, a constant temperature and high humidity test is performed to this sample SP. Here, the constant temperature and high humidity test is performed by immersing it in warm water at 80° C. for 80 minutes. Then, a bending test is performed to the sample SP that has been subjected to the constant temperature and high humidity test.

2. Bending Test

Figure 13A:
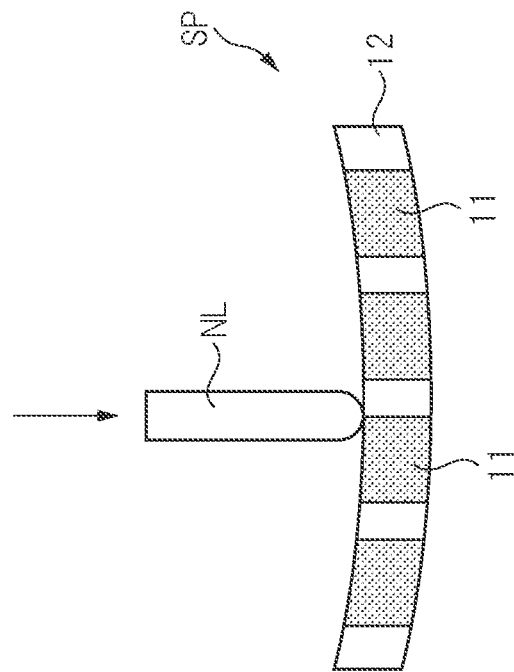
FIG. 13A is a cross-sectional view showing a state of the bending test.
Figure 13B:
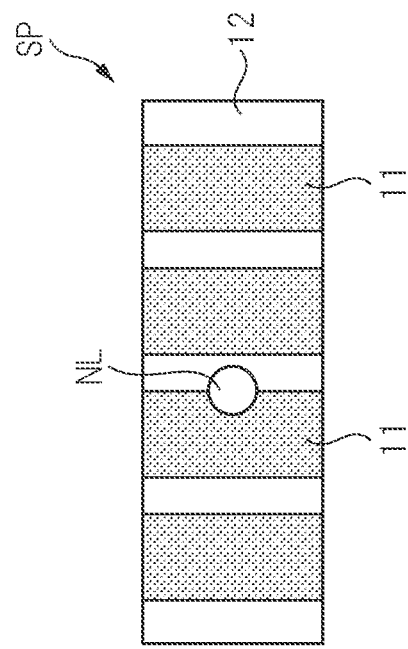
FIG. 13B is a top view showing the state of the bending test.

FIG. 13A is a cross-sectional view showing a state of a bending test, and FIG. 13B is a top view showing the state of the bending test. As shown in FIG. 13A, a tip of an indenter NL is brought into contact with the interface between the scintillator 11 and the reflector and, as shown in FIG. 13B, the tip of the indenter NL is arranged so as to be located at a center of the sample SP in a width direction of the sample SP.

In the bending test, measured is the breaking strength when the sample SP is broken by pressing the indenter NL against the sample SP from above. It can be said that the higher the breaking strength, the higher the adhesive force of the interface between the scintillator 11 and the reflector 12. That is, the adhesive force of the interface between the scintillator 11 and the reflector 12 can be evaluated based on the breaking strength measured by the bending test. The evaluation results will be described below.

Incidentally, a measuring device used for the bending test is composed of, for example, a drive machine (FGS-50V-L: manufactured by SHIMPO) and a tension gauge (FGC-5: manufactured by SHIMPO). In addition, the number of measurement points of the sample used for the measurement is three, and the breaking strength of the sample is evaluated by an average value of the three measurement points.

3. Evaluation Result

FIG. 14 is a diagram showing evaluation results of a bending test.

Figures 14A, 14B:
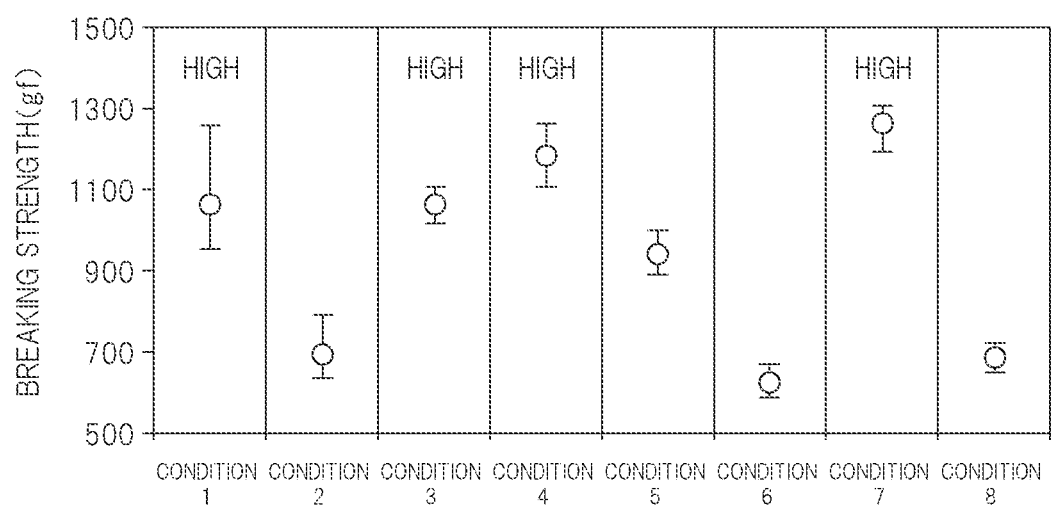
FIG. 14A is a table showing conditions of a surface treatment applied to the scintillator structure before forming a sample.
FIG. 14B is a graph showing a breaking strength measured by performing the bending test with respect to a sample corresponding to each of "Condition 1" to "Condition 8".

FIG. 14A is a table showing conditions of a surface treatment performed to a scintillator structure 10A before a sample SP is formed. In FIG. 14A, eight samples SP are manufactured by processing the scintillator structure 10A to which the surface treatment has been performed under eight conditions. For example, "Condition 1" indicates a condition of applying the reflector after the IPA treatment, titanium-oxide-liquid immersion treatment, pure water cleaning treatment are performed as the surface treatment in this order. "Condition 2" indicates a condition of applying the reflector without performing the above-mentioned treatments as the surface treatment.

FIG. 14B is a graph showing a breaking strength measured by performing a bending test to a sample SP corresponding to each of "Condition 1" to "Condition 8". As shown in FIG. 14B, it can be seen that the breaking strength of the sample SP subjected to the titanium-oxide-liquid immersion treatment as the surface treatment becomes high. Specifically, it can be seen that the breaking strength of the interface between the scintillator 11 and the reflector 12 is 900 gf or more in the sample SP subjected to the titanium-oxide-liquid immersion treatment.

From this evaluation result, it is understood that the following is supported: the adhesive force of the interface between the scintillator 11 and the reflector 12 becomes high by performing the titanium-oxide-liquid immersion treatment to the surface of the scintillator 11 before the reflector 12 is applied so as to cover the scintillator 11 made of the "resin GOS".

Incidentally, from the viewpoint of improving the adhesion properties of the interface between the scintillator 11 and the reflector 12, the breaking strength of the interface is preferably 938 gf or more, more preferably, 1059 gf or more, and 1182 gf or more.

As described above, although the invention made by the present inventors has been specifically described based on the embodiments thereof, the present invention is not limited to the embodiments and, needless to say, can be variously modified without departing from the scope thereof.

What is claimed is:

1. A scintillation structure comprising:
    a plurality of cells; and
    a reflector covering the plurality of cells,
    wherein each of the plurality of cells contains a resin and a phosphor,
    the phosphor is made of gadolinium oxysulfide that contains terbium and cerium,
    each density of the plurality of cells is 4.4 g/cm$^3$ or more and 5.0 g/cm$^3$ or less, and
    each thickness of the plurality of cells is 0.5 mm or more and 1.8 mm or less.

2. The scintillation structure according to claim 1, wherein the resin is an epoxy resin.

3. The scintillation structure according to claim 1, wherein each of the plurality of cells is formed by a rectangular parallelepiped shape having a processed surface.

4. The scintillation structure according to claim 3, wherein each of the plurality of cells has a work-affected layer.

5. The scintillation structure according to claim 1, wherein the phosphor generates fluorescence by x-ray irradiation.

6. A method of manufacturing a scintillation structure, the scintillation structure including a plurality of cells each of which has a resin and a phosphor, and a reflector covering the plurality of cells, the method comprising:
    individualizing a substrate into the plurality of cells;
    arranging the plurality of cells individualized; and
    forming the reflector so as to cover the plurality of cells arranged,
    wherein the phosphor is made of gadolinium oxysulfide that contains terbium and cerium,
    each density of the plurality of cells is 4.4 g/cm$^3$ or more and 5.0 g/cm$^3$ or less, and
    each thickness of the plurality of cells is 0.5 mm or more and 1.8 mm or less.

7. A scintillation structure comprising:
    a plurality of cells; and
    a reflector covering the plurality of cells,
    wherein each of the plurality of cells contains a resin and a phosphor,
    the phosphor is made of gadolinium oxysulfide that contains praseodymium and cerium,
    each density of the plurality of cells is 4.4 g/cm$^3$ or more and 5.0 g/cm$^3$ or less, and
    each thickness of the plurality of cells is 0.3 mm or more and 2.5 mm or less.

8. The scintillation structure according to claim 7, wherein the resin is an epoxy resin.

9. The scintillation structure according to claim 7, wherein each of the plurality of cells is formed by a rectangular parallelepiped shape having a processed surface.

10. The scintillation structure according to claim 9, wherein each of the plurality of cells has a work-affected layer.

11. The scintillation structure according to claim 7, wherein the phosphor generates fluorescence by x-ray irradiation.

12. A method of manufacturing a scintillation structure, the scintillation structure including a plurality of cells each of which has a resin and a phosphor, and a reflector covering the plurality of cells, the method comprising:
    individualizing a substrate into the plurality of cells;
    arranging the plurality of cells individualized; and
    forming the reflector so as to cover the plurality of cells arranged,
    wherein the phosphor is made of gadolinium oxysulfide that contains praseodymium and cerium,
    each density of the plurality of cells is 4.4 g/cm$^3$ or more and 5.0 g/cm$^3$ or less, and
    each thickness of the plurality of cells is 0.3 mm or more and 2.5 mm or less.

* * * * *